(12) United States Patent
Gretz

(10) Patent No.: US 6,335,488 B1
(45) Date of Patent: *Jan. 1, 2002

(54) SNAP IN CABLE CONNECTOR (75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/603,756

(22) Filed: Jun. 26, 2000

Related U.S. Application Data (63) Continuation of application No. 09/165,530, filed on Oct. 2, 1998, now Pat. No. 6,080,933.

(51) Int. Cl.[7] ................................................ H02G 3/18
(52) U.S. Cl. .............. 174/65 R; 174/65 G; 174/152 G; 174/153 G; 16/2.1; 16/2.2
(58) Field of Search ............................ 174/65 R, 65 G, 174/64, 135, 152 G, 153 G, 151, 31 R, 167, 153 R; 16/2.1, 2.2; 439/411, 439, 460, 98; 285/194, 921, 154.1, 140.1

(56) References Cited

U.S. PATENT DOCUMENTS

| | | | | |
|---|---|---|---|---|
| 4,021,604 A | * | 5/1977 | Dola et al. ..................... | 174/51 |
| 4,970,350 A | * | 11/1990 | Harrington ................ | 174/65 G |
| 5,171,164 A | * | 12/1992 | O'Neil et al. ............. | 174/65 R |
| 5,422,437 A | * | 6/1995 | Schnell ...................... | 174/65 R |
| 5,731,543 A | * | 3/1998 | Jorgensen .................. | 174/65 R |
| 6,034,325 A | * | 3/2000 | Nattel et al. .............. | 174/65 R |
| 6,034,326 A | * | 3/2000 | Jorgensen ................. | 174/65 R |
| 6,043,432 A | * | 3/2000 | Gretz ........................ | 174/65 R |
| 6,080,933 A | * | 6/2000 | Gretz ........................ | 174/65 R |
| 6,133,529 A | * | 10/2000 | Gretz ........................ | 174/65 R |
| 6,162,995 A | * | 12/2000 | Bachle et al. ............... | 174/151 |

* cited by examiner

Primary Examiner—Dean A. Reichard
Assistant Examiner—Angel R. Estrada (57) ABSTRACT A snap in locking cable connector is composed of two mating pieces that snap together and provide a connector for armored or metal clad electrical conducts. One piece includes a die cast member including a smooth outer cylindrical section having an inner diameter that may accommodate a spring steel adaptor with flanges to hold the spring steel adaptor in place. The spring steel adaptor is used in conjunction with an electrical junction box to fix the location of the locking cable connector with respect to the junction box. Another piece includes a spring steel locking ring provided to receive an armored cable and lock into the die cast member. The spring steel locking ring has tangs allowing unidirectional insertion into the die cast member and restricting withdrawal motion from the die cast member. The spring steel locking ring also includes oppositely directed tangs to permit reception of the armored cable in one direction and restrict its movement in the reverse direction.

3 Claims, 5 Drawing Sheets

SNAP IN CABLE CONNECTOR

This application is a continuation of application Ser. No. 09/165,530 filed Oct. 2, 1998, now U.S. Pat. No. 6,080,933.

BACKGROUND OF THE INVENTION

1. Field of the Invention

The present invention relates to cable terminations and more particularly to locking cable terminations which snap into place and require no screws or twisting for locking.

2. Related Prior Art

There has been an extensive number of various types of cable connectors that have been designed since the initial use of electricity prior to the turn of the century. Many types are still in use in some form. The most common initial design that is in use today is a form that was first patented in the mid-twenties. This form includes a screw that is tightened once the cable or electrical wire is in place. The electrical cable is fed into a hole or slot in a junction box through an oversized fitting that has provision for receiving a screw. In the early design the screw was configured to press directly against the electrical cable. This presented problems with the screw penetrating the insulation covering on the wire.

Presently, the screw type securement is one where the screw tightens a clamp that presses against the wire covering. The screw is normally fitted into the wall of a junction box and pulls the clamp closer to the wall as the screw is tightened. These clamps are designed so that even at their tightest when the screw pulls a portion of the clamp against the wall, there is a space between the portion of the clamp pressing against the wire and the wall of the junction box. In more recent years, there have been several patents that involve snap type fittings, of which the following patents are representative.

U.S. Pat. No. 3,858,151, titled "Flexible Conduit Connector", issued to J. H. Paskert, relates to a connector for securing a helically grooved flexible electrical conduit with a junction box that is formed as a one piece metal clip. The clip has a tubular body with tabs and barbs which engage the helical groove in the conduit to prevent the conduit from being pulled out of the clip and to electrically interconnect the clip conduit. The barbs and tabs are disposed along a common helical path to facilitate turning or screwing of the clip onto one end of the conduit. A collar on the inner end of the clip encloses the end of the conduit to protect wires in the conduit against engagement with any burrs which may be formed on the end of the conduit. Resiliently deflectable retaining arms and flanges clampingly engage a wall of the junction box to hold the clip and conduit in place. The retaining arms are provided with pointed end portions which are pressed against the wall of the junction box to electrically interconnect the clip and junction box.

U.S. Pat. No. 4,012,578, titled "One Piece Connector For Flexible Conduit", issued to T. M. Moran et al., relates to a one piece connector clip for securing a helically grooved flexible electrical conduit within generally round apertures in a junction box. The body of the clip comprises a plurality of generally flat sides and is provided with tabs which engage the helical groove in the conduit to prevent the conduit from being pulled out of the clip and to electrically interconnect the clip and conduit. A collar on the inner end of the clip encloses the end of the conduit to protect the wires contained therein against any burrs which may be present on the end of the conduit. Resiliently deflectable retaining arms and flanges clampingly engage a wall of the junction box to hole the clip and conduit in place and to electrically interconnect the clip and the junction box. In one embodiment of the invention, the body of the clip has a generally square cross-sectional configuration, in another embodiment, the body has a genally truncated equilateral triangular shape, while in still another embodiment the body has a generally hexagonal shape.

U.S. Pat. No. 4,880,387, titled "Connector For Flexible Electrical Conduit", issued to Allan Stikeleather et al., relates to a connector for joining flexible electrical conduit to a housing such as a junction box, fixture or the like which is formed cylindrically from light metal and includes relatively flexible arms depending from a relatively stiff face portion, retaining members flaring from the extending for a substantial portion of the length of the flexible arms. Multiple barbs are formed on the flexible arms to engage the conduit and flanges are formed at the extremity of the flexible arms to cooperate with the retaining members to clamp the connector to the housing.

U.S. Pat. No. 5,422,437, titled "Electrical Connector Assembly", issued to Kenneth Schnell, relates to an electrical connector assembly for coupling non-metallic electrical connector assembly includes a snap nut adaptor with an annular groove at one end forming a first mating member, and a conduit connector with resilient latch tabs forming a second mating member. Upon inserting the snap nut adaptor through a hole or knockout opening in an electrical box, the conduit connector is securely coupled thereto by inserting it over the snap nut adaptor until the latch tabs engage the annular groove via a snap fit.

SUMMARY OF THE INVENTION

The present invention provides a snap in locking cable connector composed of three mating pieces that snap together and provide a connector for helically wound armored or metal clad electrical conductors. A spring steel adaptor is used in conjunction with an electrical junction box to fix the location of the locking cable connector with respect to the junction box. A first piece of the snap in locking cable connector is a die cast member including at the inbound end a smooth outer cylindrical section, having an outer diameter with flanges that accommodates a spring steel adaptor. Another piece is a spring steel locking ring provided to receive a helically wound shielded cable and inserted into the out end of the die cast member. The locking ring has outwardly directed tangs which allow insertion into the die cast member but restricts withdrawal from the die cast member. The locking ring also has oppositely directed tangs to receive the armored cable and restrict its movement in a reverse direction.

The die cast member may have one or more flat surfaces around its periphery forming a hexagon on one of the flanges to allow gripping by a wrench or other tool for tightening or loosening or making minor adjustments in the positioning of the armored cable in the member once the armored cable is inserted into the steel locking ring. Rotating the die cast member in one direction will pull the armored cable and advance it further into the member.

The spring steel locking ring has a cut out section to permit slight compression so that the locking ring may be easily inserted into the die cast member. Once inserted, the locking ring is able to expand to the full inner diameter of the die cast member to provide a tight fit.

DESCRIPTION OF THE INVENTION

A continual problem in building construction is the problem of running armored cable for electrical connections. Many connectors require that there exist enough room with the junction box to permit insertion of a screw driver to tighten the cable and fix its position with respect to the junction box. Still other connectors can fix the position of the cable with respect to the junction box. However, once the connection is made, the cable cannot be backed out without the connection to the junction box being taken apart, which may not always be done easily.

In practicing the present invention, a three piece snap in cable connector is configured for use with a helically wound cable that locks into the junction box. The snap in cable connector is arranged to grip the helical grooves in an armored cable securely to lock it in position with respect to the cable connector.

Figures 1, 2:
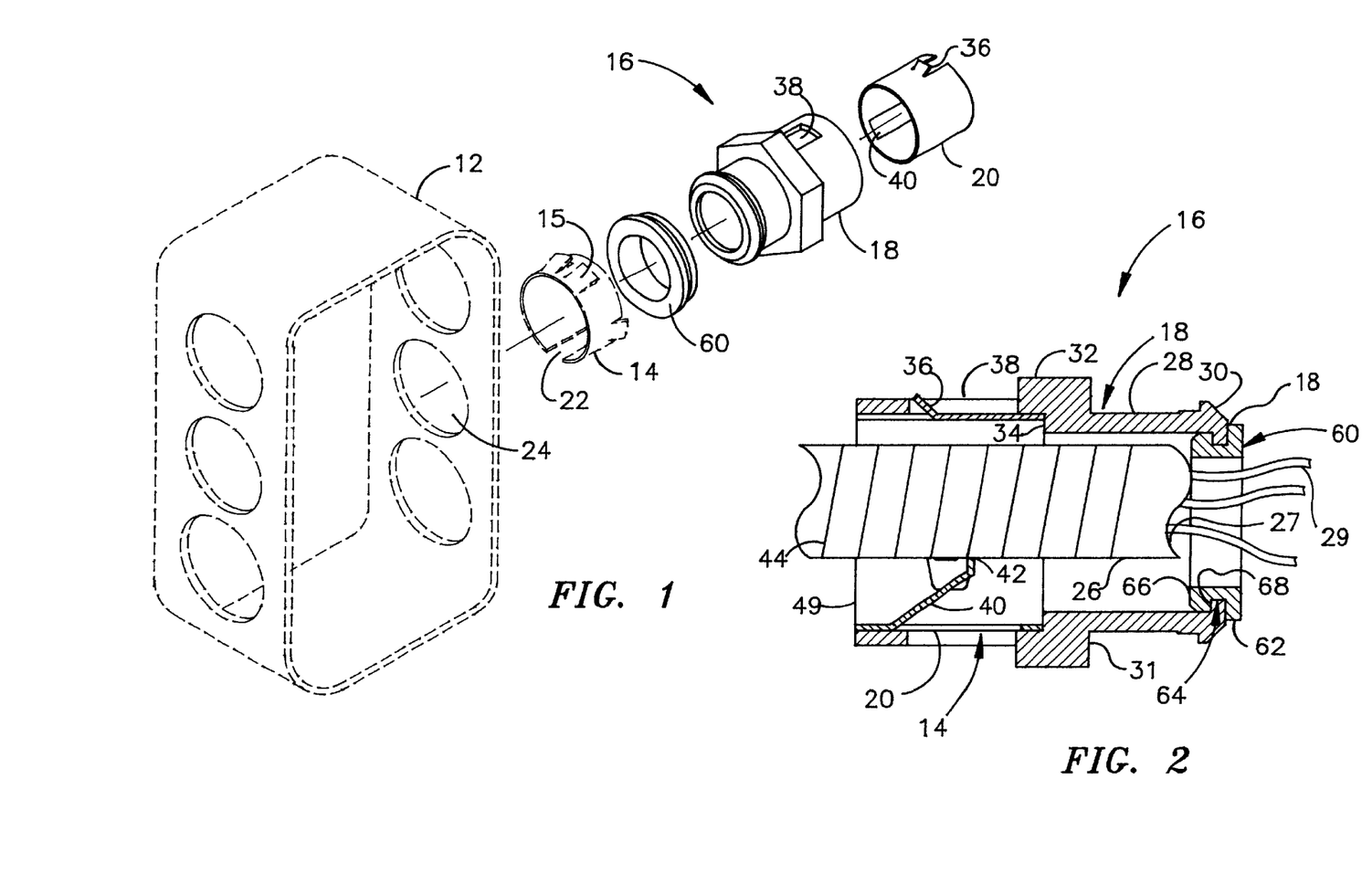
FIG. 1 is an exploded view of a junction box, a first embodiment of a spring steel adaptor and a snap in cable connector.
FIG. 2 is a sectional view of a snap in cable connector having a first embodiment of a die cast member and a first embodiment of a spring steel locking ring.

Referring now to FIG. 1, an exploded view of a junction box 12, a snap in cable connector 16 with spring steel adapter 14, a first embodiment of a die cast member 18, and a first embodiment of a spring steel locking ring 20 is illustrated. Spring steel adapter 14 includes a slot 22 to permit expansion prior to being fitted over the reduced diameter area 28. Adapter 14 fits into aperture 24 of junction box 12. Adapter 14 also includes a plurality of tangs 15 to prevent removal of adapter 14 once inserted into aperture 24. A more detailed operation of adapter 14 may be found in U.S. Pat. No. 5,373,106, "Quick-Connect Fitting For Electrical Junction Box", assigned to the same assignee as the present invention and is incorporated herein by reference in its entirety.

FIG. 2 is a cross-sectional view of cable connector 16 illustrating the interconnection of die cast member 18 and spring steel locking ring 20 and the locking function of spring steel locking ring 20 around an armored cable 26.

A first embodiment of the die cast member 18 is illustrated as having a reduced diameter area 28 for receiving adapter 14. A lip 30 prevents adapter 14 from slipping out once inserted. Lip 30 has a slight incline to permit insertion into aperture 24 of junction box 12. On the other side of area 28 is a perpendicular face 31 as part of an enlarged hexagonal section 32. The diameter of face 31 is greater than the diameter of lip 30 to prevent over insertion into aperture 24. Die cast member 18 with adapter 14 can be inserted into aperture 24 only up to the face 31 of section 32. Section 32 with its flat parallel surfaces forms a hexagonal shape when viewed from the end. When steel locking ring 20 is inserted with its cable gripping tangs, this hexagonical shape allows gripping with a standard fixed or adjustable wrench to draw armored cable 26 into the steel locking ring 20. In this manner, minor adjustments to the position of armed cable 26 can be effected. The inner diameter of die cast member reduces on the inside of section 32 to form face or should 34 to restrict insertion of steel locking ring 20. Thus, the inside diameter of the locking ring is approximately the same as the inside diameter of the shoulder 34.

A first embodiment of a steel locking ring 20 is illustrated as inserted into die cast member 18 with a first tang 36 in a corresponding opening 38 in die cast member 18. As is seen, the spring steel tang 36 has an outward extending angle which permits the tang to be depressed inward as the steel locking ring is inserted into the outer aperture 49 of the member 18, yet spring outward into openings 38 and 38A to prevent withdrawal. Also illustrated is cable tang 40 in steel locking ring 20, gripping the bottom of the helical recesses of armored cable 26 at point 42 in helical groove 44. Shoulder 34 of die cast member 18 is positioned such that the end of tang barely clears the end of opening 38 before steel locking ring 20 reaches a place where it cannot be inserted further.

As is seen in FIG. 2, the armored cable 26 is cut at the end 27 of the connector which is just inside the inner end. The wires 29 are connected on the inside of the junction box. Also shown in FIG. 2 is a plastic grommet 60 which has flange 62 preventing full insertion into the inner end of the connector. The grommet has a reduced diameter section 64 and latch 66 which fit over a ridge 68 on the connector. The grommet can be pushed into the connector until the latch 66 catches on the ridge 68. The grommet prevents chafing of the wires 29 and helps retain the armored cable 26 in the connector.

Figure 3:
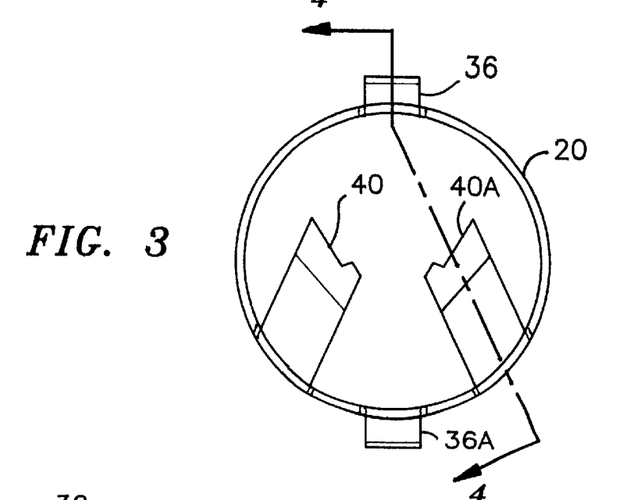
FIG. 3 is a sectional view of a first embodiment of the spring steel locking ring of FIG. 2.

Referring now the FIG. 3, an end view of the first embodiment of a steel locking ring 20 is illustrated as having two tangs 36 and 36A to provide locking stability when inserted into die cast member 18. It is to be noted that tangs 36 and 36A have angled outward surfaces and relatively flat axial surfaces since the force that needs to be exerted on die cast member 18 is in direct line with the direction of insertion and removal. Generally cylindrical spring steel locking ring 20 is provided to receive armored cable 26 and lock it into die cast member 18. Steel locking ring 20 has a first set of tangs 36 and 36A to allow insertion into die cast member 18 while restricting withdrawal of locking ring 20 from die cast member 18. The first set of tangs 36 and 36A includes a pair of tangs located at one end of locking ring 20 with the pair of tangs spaced on opposite side from each other. In an alternate arrangement, the first set of tangs includes three tangs (not shown) located at one end of locking ring 20. The three tangs may be equally spaced along the circumference of the generally cylindrical spring steel locking ring 20.

Also illustrated are two cable gripping tangs 40 and 40A for securely holding armored cable 26 in position. The surfaces of tangs 40 and 40A have a relatively flat axial surface with the tangs angled inward toward the inner end of the member 18. As is seen, the tangs 36, 36A, 40 and 40A are lanced from the cylindrical wall of the locking ring 20. The inside end 41 of cable gripping tangs 40 and 40a are bent on a radial direction and jagged with points since the force that needs to be exerted is helical or twisting in nature and a flat surface would slide along groove 44 of armored cable 26. In FIG. 3, steel locking ring 20 shows the second set of tangs oppositely directed from the first set of tangs to receive armored cable 26 and prevent its removal in a reverse direction. The second set of tangs includes a pair of tangs 40 and 40A, centrally located from the ends of locking ring 20, the pair of tangs 40 and 40A are spaced one hundred twenty degrees apart from each other along the internal circumference of locking ring 20. This arrangement pushes armored cable 26 against one side of steel locking ring 20 when there is an attempt to pull armored cable 26 from snap in cable connector 26, reducing the effective diameter of steel locking ring 20 to the diameter of armored cable 26. In an alternate embodiment, the second set of tangs may include three tangs (not shown) centrally located in locking ring 20, the three tangs may be spaced one hundred twenty degrees apart from each other along the internal circumference of locking ring 20. In this arrangement the tangs evenly distribute the force that may be exerted to remove the cable around the outside of armored cable 26, with the tangs digging into groove 44.

Figure 4:
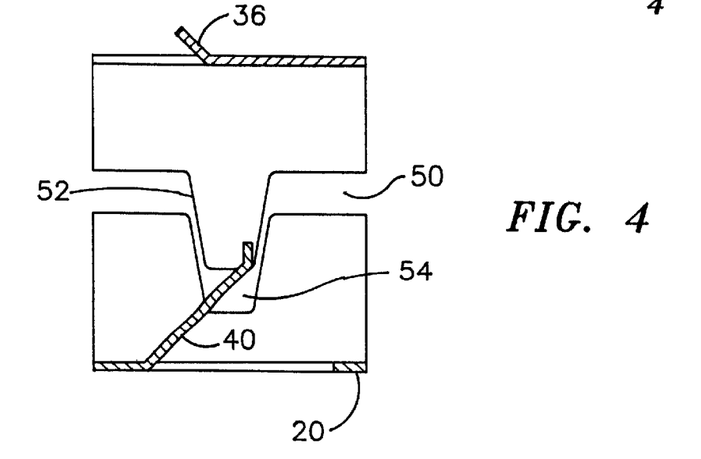
FIG. 4 is a side sectional view of the spring steel locking ring taken along lines 4—4 of FIG. 3.

FIG. 4 illustrates an arrangement of the steel locking ring having a slot 50 with an offset piece or tongue 52 on one side of slot 50 that fits into a concomitant cutout 54 on the other side of slot 50. Slot 50 permits compression of steel locking ring 20 to an outer diameter smaller than the inner diameter of die cast member 18. This arrangement allows easy insertion of steel locking ring 20 into die cast member 18 and expansion of the outer diameter of steel locking ring 20 to fit tightly into the inner diameter of die cast member 18. Slot 50 with offset piece 52 on one side with concomitant cutout 54 on the other side assures that tangs 36 and 36A of steel locking ring 20 remain aligned with openings 38 and 38A of die cast member 18. Without offset piece 52 and cutout 54, compression of steel locking ring 20 permitted by slot 50 may result in a sliding of one side of slot 50 with respect to the other or deforming of a locking ring 20 so that one tang, for example, tang 36, may align with opening 38 while due to deformation, tang 36A is still outside die cast member 18 and does not align with opening 38A.

Figure 5:
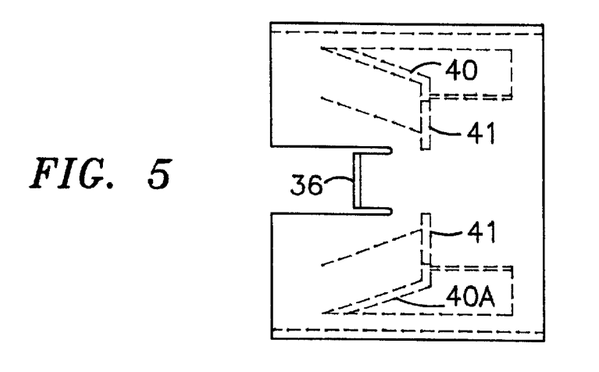
FIG. 5 is a top view of the spring steel locking ring of FIG. 4.

FIG. 5 is a top view of steel locking ring 20 of FIG. 3 with cable holding and tangs 40 and 40A shown in phantom with inside end 41 shown. As can be seen, tang 40 is displaced from tang 40a approximately one hundred twenty degrees along the inner circumference of steel locking ring 20.

Figure 6:
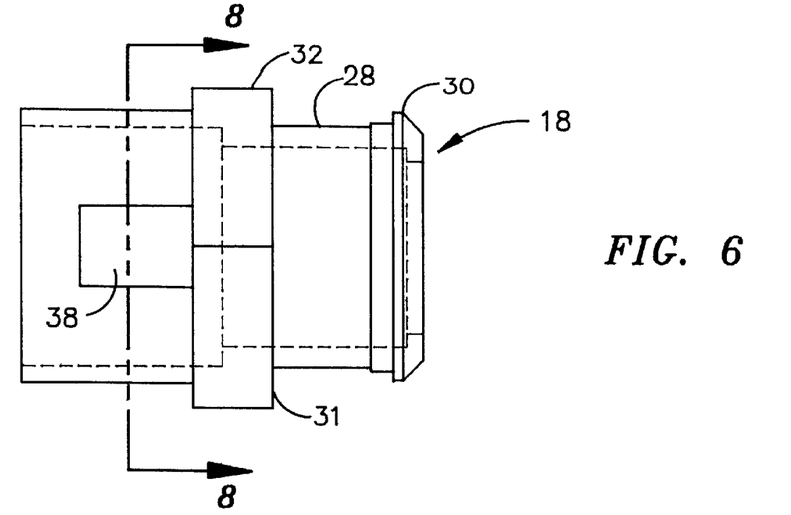
FIG. 6 is a side view of the die cast member of FIG. 2.

Referring now to FIG. 6, a side view of die cast member 18 is illustrated as having reduced diameter area 28 for receiving adaptor 14. Reduced area 28 is defined by lip 30, which prevents adaptor 14 from slipping out once inserted, and enlarged flat face 31. As stated previously, lip 30 has a slight incline to permit insertion into aperture 24 of junction box 12. Also previously stated, face 31 is greater than the diameter of lip 30 to prevent over insertion into aperture 24. As can be seen by a comparison of the diameters of lip 30 and face 31, die cast member 18 with adaptor 14 can be inserted into aperture 24 only up to the edge of section 32.

Figure 7:
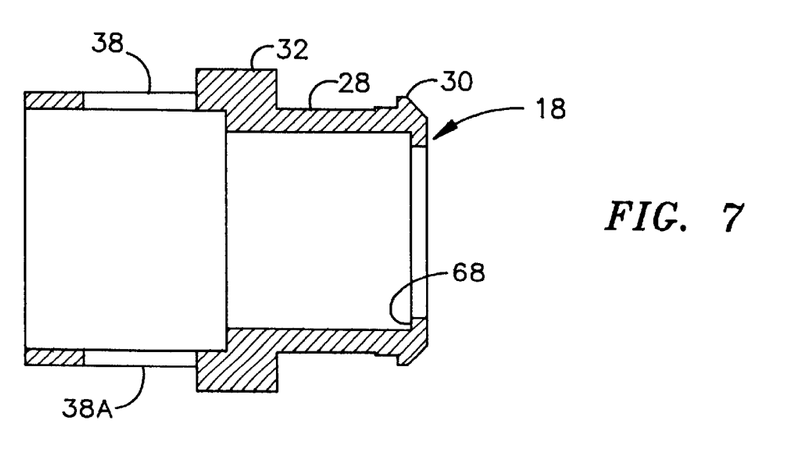
FIG. 7 is a side sectional view of the die cast member of FIG. 6.

FIG. 7 is a sectional view of the die cast member 18 illustrating first opening 38 to receive tang 36 of steel locking ring 20 and a second opening 38a to receive tang 36A of steel locking ring 20.

Figure 8:
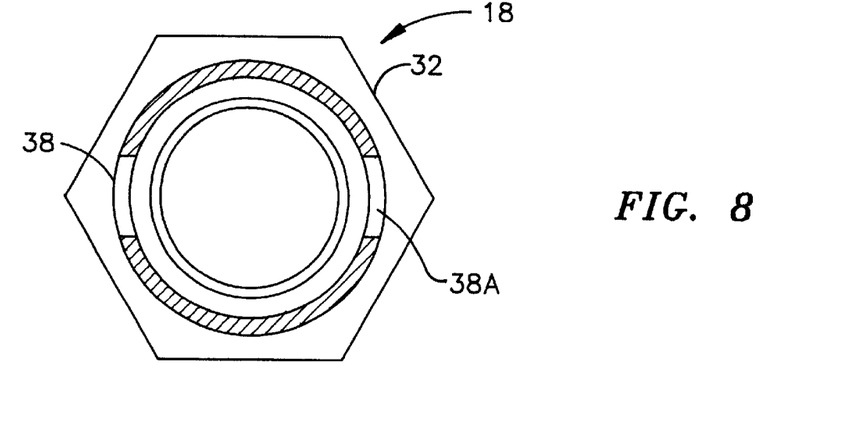
FIG. 8 is an end view of the die cast member of FIG. 6 taken along lines 8—8.

FIG. 8 is an end view of die cast member 18 illustrated in FIG. 6. As described previously and illustrated more clearly in FIG. 8, section 32 with its flat parallel surfaces forms a hexagon shape when viewed from the end. This shape is provided to allow gripping with a standard fixed or adjustable wrench. By rotating the wrench, (not shown) armored cable 26 may be drawn into the locking ring 20. In this manner, minor adjustments to the position of armored cable 26 can be performed.

Figures 9, 11:
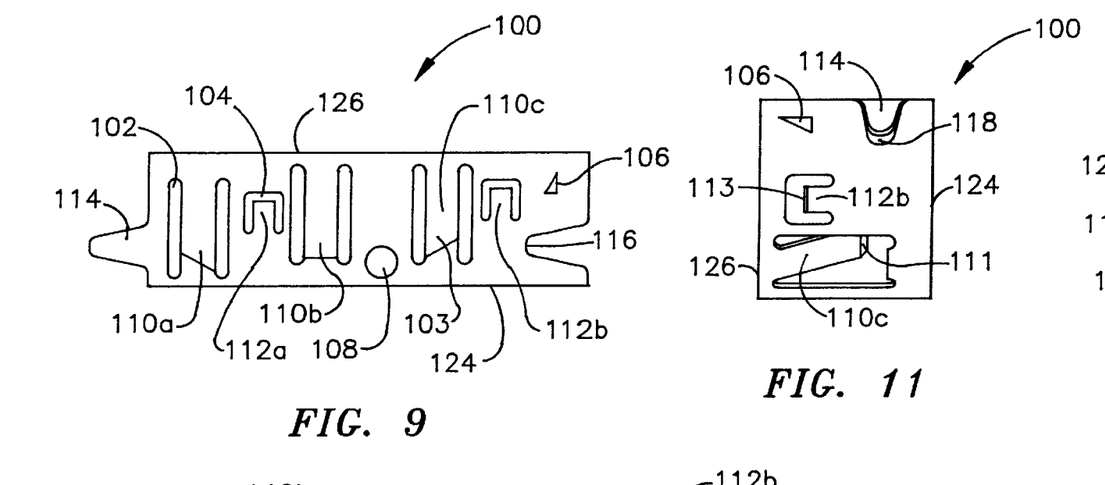
FIG. 9 is a plan view of a die-cut blank which will be formed into the second and preferred embodiment of the spring steel locking ring.
FIG. 11 is a top view of the spring steel locking ring 100 of FIG. 10.

FIG. 9 is a plan view of a die-cut blank which will be formed into the second and preferred embodiment of the spring steel locking ring 100. A plurality of lateral slots 102 are formed in pairs along the blank. Adjacent pairs of the lateral slots 102 are joined by cuts 103 extending between them. U-shaped cutouts 104 are also formed in the blank. The blank has a forward edge 124 which will be positioned toward a junction box (not shown) and a trailing edge 126 which will be positioned away from the junction box. As shown in FIG. 9, both the lateral slots 102 and U-shaped cutouts 104 are positioned at staggered distances from the forward edge 124. The blank also includes a triangle cut 106 positioned near the trailing edge 126 and an aperture 108 which will be used to hold the blank in a mandrel (not shown) while the blank is formed into the tubular shaped spring steel locking ring 100. When the blank is formed into its tubular shape, tongue 114 will partially enter the groove 116 formed on the opposite end of the blank. Lateral slots 102 and cuts 103 define staggered tangs 110a, 110b, 110c which are positioned at varying precalculated distances from the forward edge 124.

Figures 10, 12:
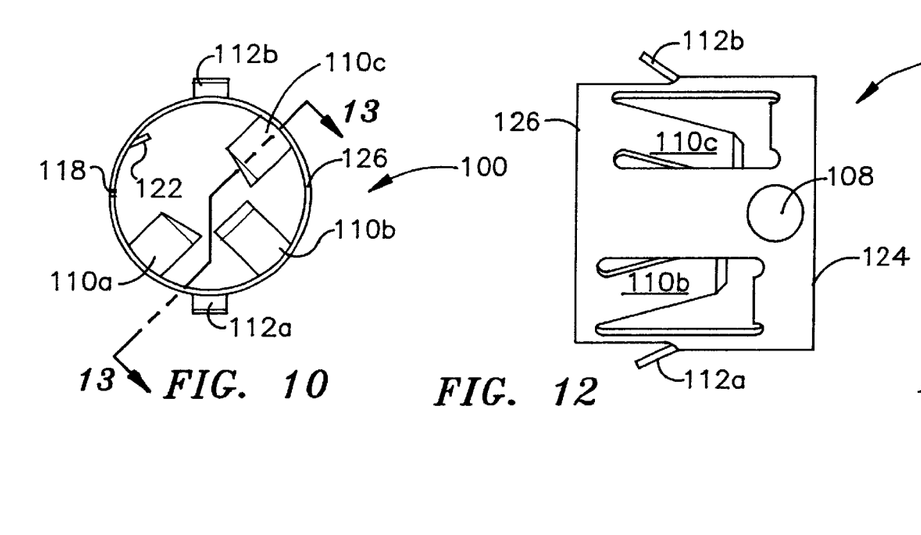
FIG. 10 is an end view of the second and preferred embodiment of the spring steel locking ring 100 from the trailing edge.
FIG. 12 is a side view of the spring steel locking ring of FIG. 10.

FIG. 10 is an end view of the second and preferred embodiment of the spring steel locking ring 100 from the trailing edge 126 after it has been formed into its tubular shape. A gap 118 remains between the two ends of the locking ring where the tongue 114 (not shown) approaches but does not contact the groove 116 (not shown). The purpose of the gap 118 is to depart a collapsible action to the spring steel locking ring 100 so that slight pressure on the outer periphery of the locking ring 100 will collapse it thereby allowing it to interact with and enter the chamber of a separate piece of the invention, a die-cast member (not shown). FIG. 10 depicts the orientation of the staggered tangs 110a, 110b, 110c, outward projecting tangs 112a, 112b and triangle-shaped cable gripper 122 on the tubular shaped locking ring 100. The outward projecting tangs 112, 112b are defined by the U-shaped cutouts 104 (not shown) and are positioned essentially 180° apart on the outer periphery of the locking ring 100. The triangle-shaped cable gripper 122 and the staggered tangs 110a, 110b, 110c are all oriented inwardly on the tubular-shaped locking ring 100.

FIG. 11 is a top view of the spring steel locking ring 100 of FIG. 10. As shown in FIG. 11, the edge 111 of the staggered cable tangs (110*c* depicted) are oriented toward the forward edge 124 which will be oriented toward the junction box (not shown). By being oriented toward the forward edge 124, edges 111 of the staggered cable tangs (110*c* depicted) will be able to grip and hold an armored cable (not shown) which will be inserted from the direction of the trailing edge 126. Conversely, the outward projecting tangs (112*b* shown), will be oriented with their edges 113 toward the trailing edge 126 of the spring steel locking ring 100.

FIG. 12 is a side view of the spring steel locking ring of FIG. 10. As depicted in FIG. 12, the outward projecting tangs 112*a*, 112*b* are at staggered distances from trailing edge 126. Two staggered cable tangs 110*b*, 110*c* are depicted at staggered distances from forward edge 124.

Figure 13:
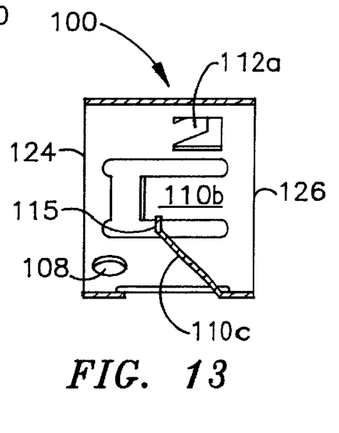
FIG. 13 is a cross-sectional view of the spring steel locking ring 100 taken along lines 13—13 of FIG. 10.

FIG. 13 is a cross-sectional view of the spring steel locking ring 100 taken along lines 13—13 of FIG. 10. Staggered cable tang 110*c* is depicted extending inwardly into the tubular shaped locking ring 100. An angled end 115 is shown near the end of staggered cable tang 110*c*.

Figure 14:
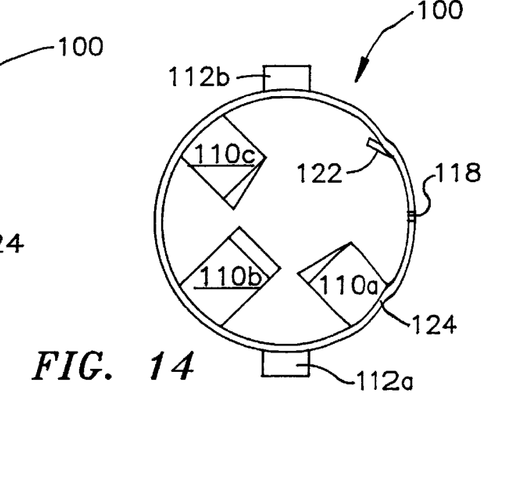
FIG. 14 is an end view of the preferred embodiment of the spring steel locking ring as viewed from the forward edge.

FIG. 14 is an end view of the preferred embodiment of the spring steel locking ring as viewed from the forward edge 124. The staggered cable tangs 110*a*, 110*b*, 110*c* are oriented toward the forward edge 124.

Figures 15, 16, 17, 18, 19, 20:
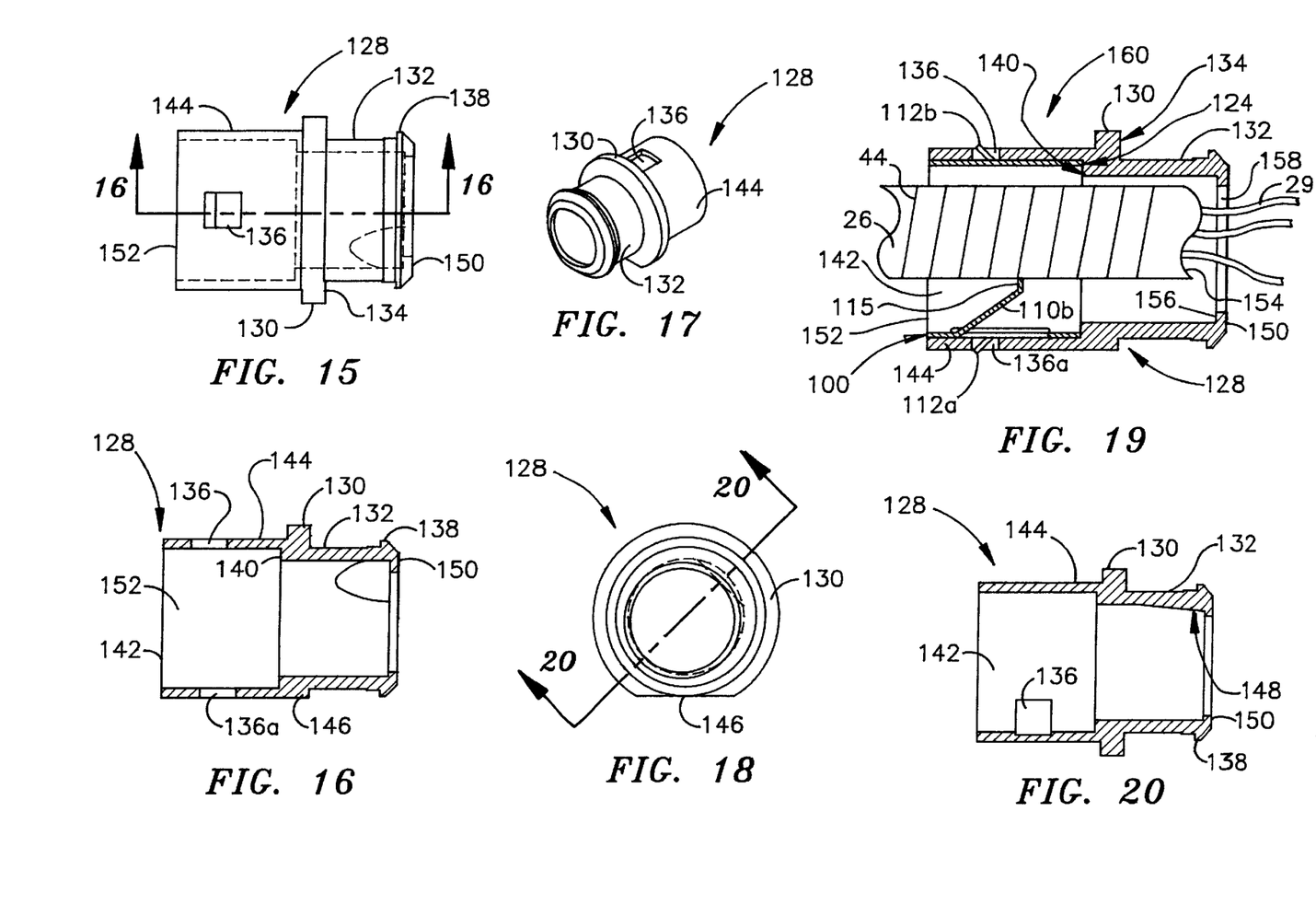
FIG. 15 is a side view of the second and preferred embodiment of the die cast member.
FIG. 16 is a cross-sectional view of the die-cast member 128 as taken along lines 16—16.
FIG. 17 is a perspective view of the die-cast member 128 of FIG. 15.
FIG. 18 is an end view of the die-cast member 128 as viewed from the right side of FIG. 15.
FIG. 19 is a cross-sectional view of the assembled die-cast member and spring steel locking ring including an inserted cable held in place by the staggered cable tangs.
FIG. 20 is a cross-sectional view of the die cast member taken along lines 20—20 of FIG. 18.

A side view of the second and preferred embodiment of the die-cast member 128 is shown in FIG. 15. The generally tubular-shaped die-cast member 128 has a central flange 130 located approximately mid-way along its length. Flanking the central flange 130 are a reduced diameter seat 132 and a rear cylindrical body portion 144. The die-cast member 128 includes a forward end 150 and a rearward end 152. The forward end 150 will be oriented toward a junction box (not shown) when put in use. A lip 138 is located at the forward end 150 of the die cast member 128 and the lip 138 and central flange 130 define the boundaries of reduced diameter seat 132. The seat 132 will later accommodate a spring steel adapter (not shown) which will connect the die-cast member to a junction box (not shown). Cylindrical body portion 144 includes openings (136 shown) which will later accommodate the outward projecting tangs (not shown) of the spring steel locking ring (not shown).

FIG. 16 is a cross-sectional view of the die-cast member 128 as taken along lines 16—16 of FIG. 15. A hollow chamber 142 is formed in the rearward portion of the die-cast member 128. The chamber 142 will later accommodate the spring steel locking ring 100 (not shown). Openings 136, 136*a* in the tubular body of the die-cast member 128 will later accommodate the outward projecting tangs (not shown) of the spring steel locking ring. By being staggered at different distances from the rearward end 152 of the die-cast member 128, the openings 136, 136*a* will require that the spring steel locking ring (not shown) be oriented such that each outward projecting tang seats in its proper opening. As shown in FIG. 16, central flange 130 extends outward of the main body portion of the die-cast member 128 throughout most of its periphery except for a flat edge 146 on one side.

FIG. 17 is a perspective view of the die-cast member 128 of FIG. 15 and depicts the relative positioning of the central flange 130, rear cylindrical body portion 144, one opening 136 in the rear cylindrical body portion, and the reduced diameter seat 132.

FIG. 18 is an end view of the die-cast member 128 as viewed from the right side of FIG. 15. Central flange 130 is shown extending around most of the periphery of the tubular-shaped die-cast member 128 except for flat edge 146. Flat edge 146 will enable easier turning of the die-cast member 128 with respect to a junction box (not shown) once the two are adjoined.

FIG. 19 is a cross-sectional view of the assembled die-cast member 128 and spring steel locking ring 100 including a cable 26 inserted within the assembly and held in place by the staggered cable tangs (110*b* shown). To create the connector assembly 160, the installer puts gentle pressure on the outer periphery of the spring steel locking ring 100 compressing its outer diameter and closing the gap (not shown). The spring steel locking ring 100, in its compressed diameter state, is then slipped into the cylindrical chamber 142 at the rearward end 152 of the die-cast member 128. The spring steel locking ring 100 is rotated until outward projecting tang 112*b* snaps into opening 136 in the rear cylindrical body portion 144 and outward projecting tang 112*a* snaps into opening 136*a*. As the outward projecting tangs 112*a*, 112*b* are at staggered distances from the edge of the spring steel locking ring 100, the locking ring 100 has only one orientation with respect to the die-cast member 128 as the two are joined.

The cable 26 is then inserted within the connector assembly 160. The cable 26 is an armored clad cable having helical grooves 44 around its periphery. An installer would typically push the cable into the chamber 142 containing the spring steel locking ring 100 at the rear 152 of the die-cast member 128 and advance it until the end 154 of the cable contacted the ridge 156 at the forward end 150 of the die-cast member 128. Wires 29 typically extend through the mouth 158 of the die-cast member 128.

As it is advanced into the connector assembly 160, the staggered cable tangs (110*b* shown) force the cable 26 against the inner surface of the connector assembly. Referring to FIG. 10, it can be seen that the three staggered cable tangs 110*a*, 110*b*, 110*c* force the cable (not shown) against the cable gripper 122 on the opposite side of the spring steel locking ring 100. Referring again to FIG. 19, the staggered cable tangs (110*b* shown) are staggered longitudinally along the spring steel locking ring 100 at the proper distance to allow each staggered cable tang to engage one of the helical grooves 44 on the cable 26. Staggered cable tang 110*b* is depicted engaging the helical groove 44 of the cable 26 in FIG. 19. The angled end 115 of the staggered cable tang 110*b* enables the tang to bite directly into the helical groove 44. The combination of the staggered cable tangs biting into the helical grooves and the cable gripper engaging the cable surface prevent the cable 26 from being pulled out of the connector assembly 160. An adapter clip (not shown) can then be slid over lip 138 until engaging flat face 134. The adapter clip will seat on the reduced diameter seat 132 of the connector assembly 160.

The connector assembly 160 including an installed adapter, can then be snapped into place in the knock-out of a junction box. The connector assembly 160 will advance into the junction box (not shown) until flat face 134 of central flange 130 engages the wall of the junction box. The connector assembly is then fastened to the junction box by the adapter and the cable is locked in position with respect to the die-cast member by the combined action of the staggered cable tangs and the cable gripper.

FIG. 20 is a cross-sectional view of the die-cast member 128 taken along line 20—20 of FIG. 18. The die-cast member 128 includes a thicker wall portion 148 adjacent its forward end 150. The thicker wall portion 148 works in conjunction with the staggered cable tangs (not shown) of the spring steel locking ring to force the cable to the opposite side of the channel and against the cable gripper (not shown).

A snap in locking cable connector has been described that is composed of three mating pieces that snap together and provide a connector for armored or metal clad electrical conductors. One piece includes a die cast member having a smooth outer cylindrical section. This section accommodates a spring steel adaptor. The smooth cylindrical section has flanges at each end defining to hold the spring steel adaptor in place. The spring steel adaptor is used in conjunction with an electrical junction box to fix and lock in the locking cable connector with respect to the junction box. Another piece includes a spring steel locking ring provided to receive a helical shielded or armored cable. The spring steel locking ring locks into the die cast member. The spring steel locking ring has tangs allowing unidirectional insertion into the die cast member and restricting withdrawal from the die cast member. The spring steel locking ring also includes oppositely directed cable gripping tangs to permit reception of the armored cable in one direction and restrict its movement in the reverse direction.

Thus, the use of the connector permits a simple assembly by snapping the helical armored cable into the connector and snapping the connector and cable to the junction box. The connector can be slightly rotated to take up any slack with the armored cable if the inside ends 41 of the tangs rest at the bottom of a groove which requires some tightening.

What is claimed is:

1. A method for attaching an armored or metal clad electrical cable to a junction box comprising:

providing a junction box having an aperture;

providing a member having a leading end with an external cylindrical surface and a trailing end with an inner diameter;

providing a spring steel adapter surrounding said leading end external cylindrical surface for snap fitting into said aperture;

providing a spring steel loading ring inserted into said trailing end inner diameter;

restricting rearward withdrawal motion of said spring steel locking ring from said member;

receiving an armored or metal clad cable in said spring steel locking ring; and preventing removal of said armored or metal cable in a rearward direction from said spring steel locking ring.

2. The method according to claim 1 wherein said restricting rearward withdrawal motion includes:

providing two or more tangs located at one end of said spring steel locking ring, said tangs equally spaced around the circumference of said generally cylindrical spring steel locking ring; and distributing a force applied for rearward withdrawal of said spring steel locking ring to said points along said locking ring.

3. The method according to claim 1 wherein said preventing removal includes:

providing three tangs centrally located in said locking ring, said three tangs spaced from each other along the internal circumference of said locking ring; and distributing a force applied for preventing removal of said armored cable along the three points on said spring steel locking ring.

* * * * *

UNITED STATES PATENT AND TRADEMARK OFFICE
CERTIFICATE OF CORRECTION

PATENT NO.      : 6,335,488 B1
DATED           : January 1, 2002
INVENTOR(S)     : Thomas J. Gretz

It is certified that error appears in the above-identified patent and that said Letters Patent is hereby corrected as shown below:

Column 10,
Line 4, the portion of the claim that reads "loading" should read -- locking --.

Signed and Sealed this

Twelfth Day of November, 2002

Attest:

Attesting Officer

JAMES E. ROGAN
Director of the United States Patent and Trademark Office